United States Patent
Joa et al.

(10) Patent No.: US 9,508,057 B2
(45) Date of Patent: Nov. 29, 2016

(54) AUTOMATICALLY UPDATING ACCOUNT INFORMATION

(71) Applicant: Bank of America Corporation, Charlotte, NC (US)

(72) Inventors: David Joa, San Bruno, CA (US); Timothy J. Bendel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 656 days.

(21) Appl. No.: 13/777,456

(22) Filed: Feb. 26, 2013

(65) Prior Publication Data

US 2014/0244482 A1  Aug. 28, 2014

(51) Int. Cl.
*G06Q 40/00* (2012.01)
*G06Q 10/10* (2012.01)

(52) U.S. Cl.
CPC .................. *G06Q 10/10* (2013.01)

(58) Field of Classification Search
USPC ......................... 705/35, 38, 40, 44
See application file for complete search history.

(56) References Cited

U.S. PATENT DOCUMENTS

| | | | | | |
|---|---|---|---|---|---|
| 8,121,947 | B1 * | 2/2012 | Barth | ............ | G06Q 20/102 705/40 |
| 2003/0233326 | A1 * | 12/2003 | Manley | ............ | G06Q 20/10 705/42 |
| 2005/0097039 | A1 * | 5/2005 | Kulcsar | ............ | G06Q 20/102 705/40 |
| 2006/0168509 | A1 * | 7/2006 | Boss | ............ | G06F 17/243 715/226 |
| 2008/0005021 | A1 * | 1/2008 | Brown | ............ | G06Q 20/102 705/40 |
| 2010/0005024 | A1 * | 1/2010 | Schmitz | ............ | G06Q 30/06 705/40 |
| 2010/0223160 | A1 * | 9/2010 | Brown | ............ | G06Q 20/102 705/26.1 |
| 2013/0047089 | A1 * | 2/2013 | Kulathungam | ............ | G06F 9/44 715/739 |
| 2013/0159154 | A1 * | 6/2013 | Purves | ............ | G06Q 20/36 705/35 |
| 2013/0346302 | A1 * | 12/2013 | Purves | ............ | G06Q 20/102 705/40 |
| 2014/0089191 | A1 * | 3/2014 | Brown | ............ | G06Q 20/12 705/44 |
| 2014/0108268 | A1 * | 4/2014 | Miller | ............ | G06Q 10/103 705/301 |
| 2015/0350003 | A1 * | 12/2015 | Anderson | ............ | H04L 29/06965 726/3 |

\* cited by examiner

*Primary Examiner* — Lalita M Hamilton
(74) *Attorney, Agent, or Firm* — Michael A. Springs

(57) ABSTRACT

A method of one embodiment facilitates the updating of account information. First account information associated with a payment account of a user is received by an interface, and the first account information is stored by a memory. Payee system information associated with a payee system, wherein the payee system stores one or more portions of the first account information, is also received by the interface and stored by the memory. A processor automatically determines that an update event has occurred, the update event associated with updated information comprising one or more updated values for one or more respective portions of the first account information, wherein at least a portion of the first account information stored on the payee system changes based on the update event. In response to automatically determining that the update event has occurred, the interface automatically communicates a payee update message comprising the updated account information.

20 Claims, 3 Drawing Sheets

AUTOMATICALLY UPDATING ACCOUNT INFORMATION

TECHNICAL FIELD OF THE INVENTION

The present invention relates generally to the field of payment accounts and more particularly to automatically updating account information.

BACKGROUND OF THE INVENTION

The user of a payment account may have information associated with that account stored on multiple computer systems. Account information stored on a payee system may be used to process a payment from the payment account to the payee. For example, a payee system may be configured to process a recurring payment from the payment account based on the account information stored by the payee system. Portions of the account information utilized by a payee system in such a transaction may be required to match the account information stored on a payer system for the payment to be successful. However, various events may occur that result in a change to the account information stored on the payer system. For example, a user may change his address, an account number may change as a result of fraud detection, a new account number may be issued to replace an expired credit card, or new account number may be issued as a result of merged financial institutions.

SUMMARY OF THE DISCLOSURE

In accordance with the present invention, certain disadvantages and problems associated with automatically updating account information may be reduced or eliminated.

According to one embodiment, first account information associated with a payment account of a user is received by an interface, and the first account information is stored by a memory. Payee system information associated with a payee system, wherein the payee system stores one or more portions of the first account information, is also received by the interface and stored by the memory. A processor automatically determines that an update event has occurred, the update event associated with updated account information comprising one or more updated values for one or more respective portions of the first account information, wherein at least a portion of the first account information stored on the payee system changes based on the update event. In response to automatically determining that the update event has occurred, the interface automatically communicates a payee update message comprising the updated account information.

Certain embodiments of the invention may provide one or more technical advantages. A technical advantage of one embodiment may provide simpler and more efficient updating of account information stored. This may provide greater convenience to customers, especially those with account information stored on multiple payee systems. Another technical advantage of an embodiment may provide faster and more effective updating of account information, improving the ability of users to avoid missed and/or failed payments and associated penalties (such as, for example, monetary penalties, credit score reductions, and loss of service) that may result from a payee's attempt to process a payment with account information that is not up-to-date. Furthermore, organizations using such a system may increase customer satisfaction, retention, and/or acquisition.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4, like numerals being used for like and corresponding parts of the various drawings.

Figure 1:
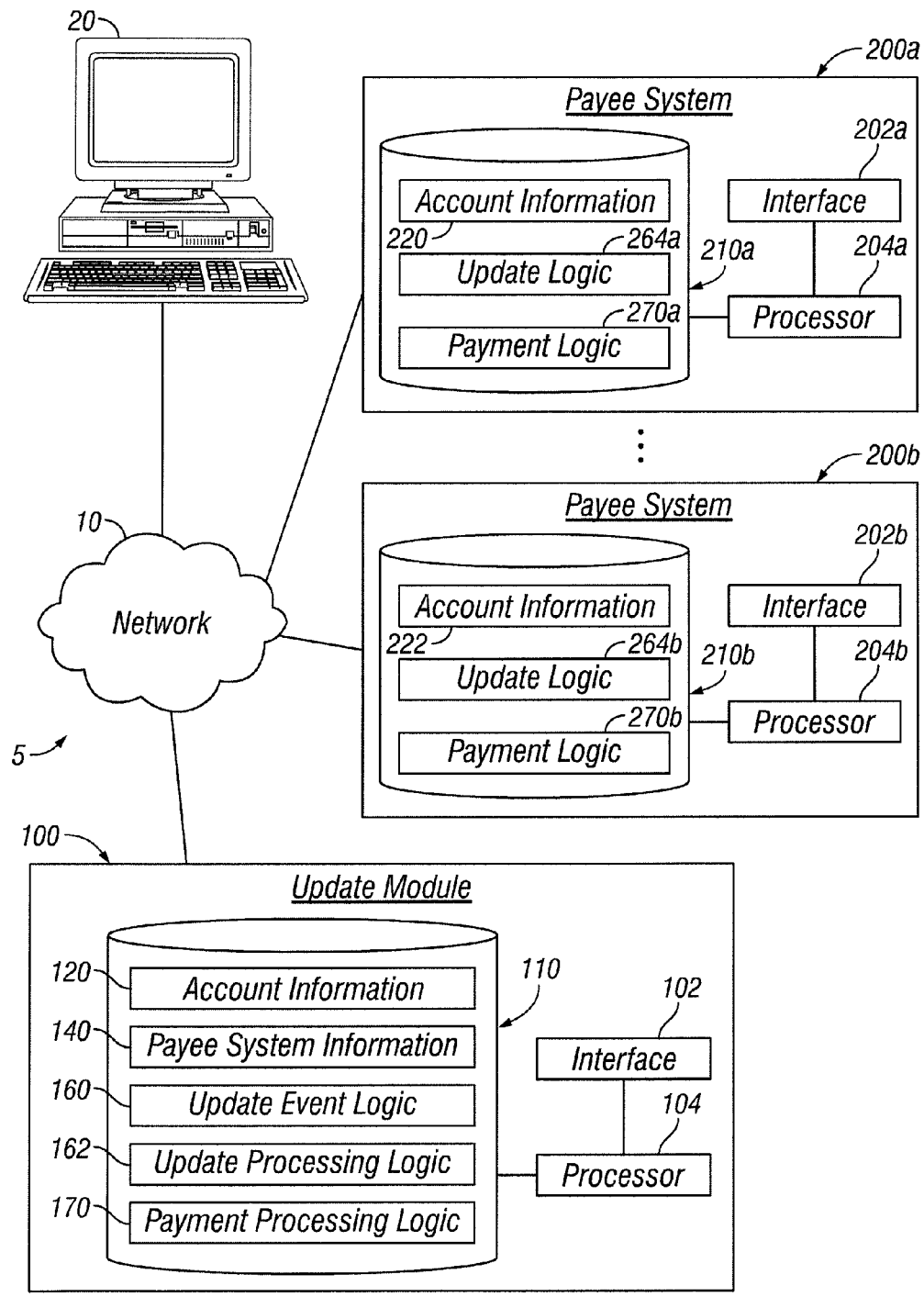
FIG. 1 illustrates an example system that facilitates account information updates.

FIG. 1 illustrates an example system 5 that facilitates automatic account information updating. System 5 includes update module 100, which communicates with one or more user devices 20 and one or more payee systems 200 (the illustrated embodiment depicts payment modules 200a and 200b) over network 10. Update module 100 includes processor 104, which is communicatively coupled to network interface 102, and memory 110. Memory 110 includes account information 120, payee system information 140, update event logic 160, update processing logic 162, and payment processing logic 170. Payment module 200a includes interface 202a, processor 204a, and memory 210a. Memory 210a includes account information 220, update logic 264a, and payment logic 270a. Payment module 200b includes interface 202b, processor 204b, and memory 210b. Memory 210b includes account information 222, update logic 264b, and payment logic 270b.

Update module 100 facilitates the automatic updating of account information stored on payee systems. A user has a payment account for making payments to one or more payees, and account information associated with this payment account is accessible to update module 100. One or more portions of this account information is also stored on a payee system, and the payee system is configured to process payments from the user's payment account to the payee using this information. When an update event occurs, indicating that one or more portions of the account information have changed or will change, update module 100 automatically determines that the update event has occurred. For example, update module 100 may determine that the user has updated personal information associated with the account, that a payment card has been renewed with a new expiration date, or that other account information has changed or will change. In response to this determination, update module 100 automatically communicates a payee update message that includes the updated portion of the account information. This payee update message facilitates the updating of the account information on the one or more payee systems. In some embodiments, the payee update message may be automatically communicated to one or more payee systems to facilitate the updating of account information stored on those systems. Update module 100 may provide a more convenient and efficient mechanism for updating account information stored on payee systems. Updating account information in this manner may enable automatic and centralized facilitation of account information updating that may improve a user's ability to update account information stored by one or more payee systems. This may provide greater convenience to customers, especially those with account information stored on multiple payee systems. This update mechanism may also help users avoid missed and/or failed payments that may have resulted from a payee's attempt to process a payment with account information that is not up-to-date. Furthermore, organizations using such a system may increase customer satisfaction, retention, and/or acquisition.

According to the illustrated embodiment, system 5 includes user devices 20 that communicate account information with update module 100 through network 10. User devices 20 communicate account information associated with a payment account of a user to update module 100. For example, a computer may be used to submit account information (such as, for example, account numbers, personal information, or other information associated with one or more payment accounts) to update module 100 through network 10.

Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

User devices 20 may include one or more laptops, personal computers, monitors, display devices, handheld devices, tablet computers, landline phones, smartphones, smart chip cards, biometric sensor devices, servers, user input devices, or any other suitable component for enabling the communication of account information. User devices 20 may also include devices owned, operated, managed, and/or housed partially or wholly by an entity other a payment account user, such as a company with which the user has an account. For example, in some embodiments, a user may communicate account information to update module 100 via a web application, while in other embodiments, account information may be retrieved by update module 100 by accessing information stored on one or more computers systems owned and operated by someone other than the user. Furthermore, multiple devices and types of user devices 20 can operate together to perform the functions described herein. User devices 20 may actively push account information to update module 100 and/or passively communicate account information by, for example, receiving requests from update module 100.

Update module 100 represents any suitable components that facilitate the updating of account information. Update module 100 may include a network server, remote server, mainframe, host computer, workstation, web server, personal computer, file server, or any other suitable device operable to process data and communicate with user devices 20 and/or payee systems 200. In some embodiments, update module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of update module 100 may be performed by any suitable combination of one or more servers or other components at one or more locations. In the embodiment where the modules are servers, the servers may be public or private servers, and each server may be a virtual or physical server. The server may include one or more servers at the same or at remote locations. Update module 100 may also include any suitable component that functions as a server. In some embodiments, user device 20 and/or one or more payee systems 200 may be integrated with update module 100, or they may operate as part of the same device or devices.

In the illustrated embodiment, update module 100 includes network interface 102, processor 104, and memory 110.

Network interface 102 represents any suitable device operable to receive information from network 10, transmit information through network 10, perform suitable processing of the information, communicate to other devices, or any combination thereof. For example, network interface 102 receives, from user devices 20, account information associated with a payment account. Network interface 102 may also receive information regarding update events. For example, network interface 102 may receive information associated with user updates of account information (such as, for example, a change of address), non-user updates of account information (such as, for example, a new expiration date for a renewed card), or any account information. In certain embodiments, network interface 102 also receives, from payee systems 200, information associated with payments. For example, network interface 102 may receive one or payment requests from payee systems. Network interface 102 may also be configured to communicate information to user devices 20 and/or payee systems 200. For example, network interface 102 may communicate payee update messages upon determining that an update event has occurred. Network interface 102 represents any port or connection, real or virtual, including any suitable hardware and/or software, including protocol conversion and data processing capabilities, to communicate through a LAN, WAN, or other communication system that allows update module 100 to exchange information with network 10, user devices 20, payee systems 200, other update modules 100, other components of system 5, or any other computer directly or indirectly connected to network 10.

Processor 104 communicatively couples to network interface 102 and memory 110, and controls the operation and administration of update module 100 by processing information received from network interface 102 and memory 110. Processor 104 includes any hardware and/or software that operates to control and process information. For example, processor 104 executes update event logic 160 to control the detection of update events and executes update processing logic 162 to control the module's response to update events. In some embodiments, processor 104 may also execute payment processing logic 170 to control the processing of payments to payee systems. Processor 104 may be a programmable logic device, a microcontroller, a microprocessor, any suitable processing device, or any suitable combination of the preceding.

Memory 110 stores, either permanently or temporarily, data, operational software, or other information for processor 104, other components of update module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 110 may include any suitable information for use in the operation of update module 100. In the illustrated embodiment, memory 110 includes account information 120, payee system information 140, update event logic 160, update processing logic 162, and payment processing logic 170. Any of these components may be distributed and/or duplicated across multiple memory devices in update module 100 or in other devices.

Account information 120 represents any suitable information associated with one or more payment accounts. Account information 120 may be input and/or accessed in various ways. Users may communicate account information 120 to update module 100 directly. For example, a user may input address information via a website interface or a mobile application. Update module 100 may also retrieve account information 120 from its own system or other systems. For example, update module 100 may analyze account information stored locally or remotely to determine account information 120. Account information 120 may include information associated with one or more users and may be stored in a relational database, tree structure, or any other suitable data structure. Account information 120 is discussed in more detail below in reference to FIG. 2.

Payee system information 140 represents any suitable information associated with one or more payee systems. Update module 100 may utilize payee system information 140 to facilitate updating account information on one or more payee systems, such as payee systems 200a and 200b. Payee system information 140 may be stored in a relational database, tree structure, or any other suitable data structure. In some embodiments, update module 100 may utilize payee system information to communicate the payee update message to a payee system. For example, if payee system information includes information that facilitates interaction with an account information update interface on a payee system (such as, for example, a URL, an IP address, computer code facilitating the steps involved in interacting with the update interface, or any other suitable information), update module 100 may include this information in the payee update message or may otherwise utilize this information in generating or communicating the payee update message. For example, to facilitate updating this account information via the payee update message, update module 100 may utilize payee system information to obtain authorization to update the payee system. For example, update module 100 may communicate authorization credentials, (such as, for example, a username, a password, a digital certificate, encryption information, or any other suitable information) to obtain the appropriate authorization for updating the account information associated with the user on the payee system. In certain embodiments, the payee update message may be communicated to users themselves, while in still other embodiments, the payee update may be communicated to an entity other than the user or the payee, so that this entity can facilitate the updating of the account information stored by payee systems 200. Payee system information 140 is discussed in more detail below in reference to FIG. 3.

Update event logic 160 represents any suitable set of instructions, logic, or code embodied in a computer-readable storage medium and operable to facilitate the selection of user accounts that the user may use to make a purchase. Update event logic 160 may be stored in memory 110 or another memory associated with update module 100. Update event logic 160, or portions thereof, may also be embodied in hardware associated with update module 100 or other components of system 5. Furthermore, the components of update event logic 160 may be stored in the same or different memories of the same or different update modules 100. Various components of update event logic 160 may also be stored in different components of system 5.

In operation, update event logic 160 processes information to determine when an update event has occurred. Update events detected by update event logic 160 encompass actual updates to account information 120 as well other events associated with such updating. In some embodiments, update event logic 160 analyzes information stored in memory 110 or another memory (on the same device or on other devices) to determine that an update event has occurred. For example, update event logic 160 may determine that one or more portions of account information 120 have been updated, which may indicate that the update account information, or a portion thereof, should be updated on one or more payee systems. Update event logic 160 may also analyze other communications or occurrences to determine that update event has occurred or will soon occur. For example, update event logic 160 may determine that a fraud event has occurred that has resulted or will result in the updating of one or more portions of account information 120. In some embodiments, update event logic 160 may also determine one or more times in the future at which update processing may be performed. The analysis performed by update event logic 160 may allow update module 100 to quickly, efficiently, and conveniently determine that update events have incurred, allowing subsequent update-related processing to be triggered automatically.

Update processing logic 162 represents any suitable set of instructions, logic, or code embodied in a computer-readable storage medium and operable to facilitate the processing that occurs in response to determining that an update event has occurred. Update processing logic 162 may be triggered by update event logic 160 or another determination that an update event has occurred. Update processing logic 162 may be stored in memory 110 or another memory associated with update module 100. Update processing logic 162, or portions thereof, may also be embodied in hardware associated with update module 100 or other components of system 5. Furthermore, the components of update processing logic 162 may be stored in the same or different memories of the same or different update modules 100. Various components of update processing logic 162 may also be stored in different components of system 5.

In operation, update processing logic 162 facilitates the updating of account information on or more payee systems in response to a previous, current, or future update of one or more portions of account information 120. To facilitate this updating, update processing logic 162 automatically generates and/or communicates a payee update message including updated account information. In some embodiments, this payee update message is communicated to one or more payee systems, such as payee systems 200. For example, update event logic 160 may determine that a payment card number has changed following a fraud event, triggering update processing logic 162, which sends a payee update message to facilitate the changing of account information stored by payee systems 200 to reflect the updated account information. In certain embodiments, the payee update message may be communicated to users themselves. For example, update processing logic 162 may communicate a payee update message to one or more of the users of the associated payment account in order to facilitate their update of the account information stored by payee systems 200. In other embodiments, the payee update may be communicated to an entity other than the user or the payee, so that this entity can facilitate the updating of the account information stored by payee systems 200. For example, the payee update message may be sent to one or more workstations associated with the institution managing the payment account so that user's of these workstations can facilitate the updating of account information stored by payee systems 200.

The payee update message may be structured in various ways. The payee update message may be a single message or multiple messages. The payee update message may utilize various formats and be communicated using various communication mechanisms. For example, in some embodiments, the payee update message may be an email, while in other embodiments, the payee update message is a communication via a web-interface of payee system 200. Furthermore, various combinations of payee update message structures and communication mechanisms are possible. For example, update processing logic 162 may facilitate logging into payee system 200a using payee system information 140 and automatically updating the account information stored by payee system 200a while also facilitating the sending of an email notification to a user of the payment account.

Payment processing logic 170 represents any suitable set of instructions, logic, or code embodied in a computer-readable storage medium and operable to facilitate the processing of payments from a payment account to a payee. Payment processing logic 170 may be triggered by communications from one or more payee systems, such as automatic and/or recurring payments initiated by payee systems 200. Payment processing logic 170 may be stored in memory 110 or another memory associated with update module 100. Payment processing logic 170, or portions thereof, may also be embodied in hardware associated with update module 100 or other components of system 5. Furthermore, the components of payment processing logic 170 may be stored in the same or different memories of the same or different update modules 100. Various components of payment processing logic 170 may also be stored in different components of system 5. Payment processing logic may be stored and/or executed by the same device that stores and/or executes update event logic 160 and update processing logic 162, or it may be stored by a different device.

In operation, payment processing logic 170 facilitates the processing of payments from the payment account to the payee system. For example, payee system 200a may store account information associated with the payment account. Using this account information, payee system 200a may request a payment from the payment account. Upon receiving a communication regarding this request (from payee system 200a or another intermediary system), update module 100 executes payment processing logic 170 to facilitate the response to this communication. For example, payment processing logic 170 may compare account information included in the request with account information 120. Payment processing logic 170 may also analyze the account information included in the request in other ways, analyze other credentials provided in the request, or perform other types of processing to facilitate the evaluation of and response to the payment request.

Payee systems 200 represent any suitable components that facilitate the updating of account information. Payee systems 200 may include a network server, remote server, mainframe, host computer, workstation, web server, personal computer, file server, or any other suitable device operable to process data and communicate with user devices 20 and/or payee systems 200. In some embodiments, update module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of payee systems 200 may be performed by any suitable combination of one or more servers or other components at one or more locations. In the embodiment where the modules are servers, the servers may be public or private servers, and each server may be a virtual or physical server. The server may include one or more servers at the same or at remote locations. Payee systems 200 may also include any suitable component that functions as a server. Furthermore, system 5 may include any number of payee systems 200. Various payee systems 200 may include different hardware and/or software, different configurations, and different operators.

In the illustrated embodiment, payee system 200a includes network interface 202a, processor 204a, and memory 210a.

Network interface 202a represents any suitable device operable to receive information from network 10, transmit information through network 10, perform suitable processing of the information, communicate to other devices, or any combination thereof. For example, network interface 202a may receive, from update module 100, one or more payment update messages. In certain embodiments, network interface 202a also facilitates payments. For example, network interface 202a may communicate with update module 100 or another device to request payments from the payment account to the payee associated with payee system 200a. Network interface 202a represents any port or connection, real or virtual, including any suitable hardware and/or software, including protocol conversion and data processing capabilities, to communicate through a LAN, WAN, or other communication system that allows update module 100 to exchange information with network 10, user devices 20, update module 100, other payee systems 200, other components of system 5, or any other computer directly or indirectly connected to network 10.

Processor 204a communicatively couples to network interface 202a and memory 210a, and controls the operation and administration of payee system 200a by processing information received from network interface 202a and memory 210a. Processor 204a includes any hardware and/or software that operates to control and process information. For example, processor 204a executes update logic 264a to control the updating of account information 220. In some embodiments, processor 204a also executes payment logic 270a to control the processing of payments. Processor 204a may be a programmable logic device, a microcontroller, a microprocessor, any suitable processing device, or any suitable combination of the preceding.

Memory 210a stores, either permanently or temporarily, data, operational software, or other information for processor 204a, other components of payee system 200a, or other components of system 5. Memory 210a includes any one or a combination of volatile or nonvolatile local or remote devices suitable for storing information. For example, memory 210a may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 210a may include any suitable information for use in the operation of payee system 200a. In the illustrated embodiment, memory 210a includes account information 220, update logic 264a, and payment logic 270a. Any of these components may be distributed and/or duplicated across multiple memory devices in payee system 200a or in other devices.

Account information 220 represents any suitable information associated with one or more payment accounts. Account information 220 may be input and/or accessed in various ways. Users may communicate account information 220 to update module 100 directly. For example, a user may input an account number, address information, and other information associated with a payment account via a website interface or a mobile application. Payee system 200a may also retrieve account information 220 from its own system or other systems. For example, payee system 200a may access account information stored by a third-party system that operates a payment service. Payee system 200a may also receive account information from update module 100. Account information 220 may include information associated with one or more users or payment accounts and may be stored in a relational database, tree structure, or any other suitable data structure.

Update logic 264a represents any suitable set of instructions, logic, or code embodied in a computer-readable storage medium and operable to facilitate the updating of account information stored by payee system 200a. Update logic 264a may be stored in memory 210a or another memory associated with payee system 200a. Update logic 264a, or portions thereof, may also be embodied in hardware associated with payee system 200a or other components of system 5. Furthermore, the components of update logic 264a may be stored in the same or different memories of payee system 200a or another device associated with payee system 200a. Various components of update logic 264a may also be stored in different components of system 5.

In operation, update logic 264a facilitates the updating of account information 220. Since payee system 200a processes payments from payment accounts using one or more portions of account information 220, the portion of account information 220 utilized in such a payment may need to match the most up-to-date account information stored by the device receiving the payment request (such as, for example, update module 100, an automated clearing house (ACH) system, or another suitable device). Update logic 264a facilitates the updating of account information 220 to enable updating of account information 220 so that it matches the payer's current information. For example, in some embodiments, update logic 264 may control a web-interface with which update module 100 can interact in order to update the necessary account information. Update logic 264a may also operate to change the account used for a payment on a payee system (rather than updating information for the same account). For example, a user may provide input to update module 100 indicating that certain payments should be processed from one or more different payment accounts (which may or may not be associated with the same user) and update logic 264a may facilitate such updates on the payee system. Update logic 264a may also communicate one or more parameters that modify how the payee system processes payments. For example, based on user input, update module 100 may communicate with a payee system to modify the respective portions of a joint payment made by multiple accounts. As another example, update module 100 may communicate with a payee system to modify an amount paid during one more automatic payments (such as, for example, updating the payee system to pay 100% of a monthly credit card balance instead of 50%). Facilitating account information updating in this manner may provide more efficient and convenient updating of this information. This may also help avoid unsuccessful payment requests that would result from utilizing account information during the payment process that does match the payer's current information.

Payment logic 270a represents any suitable set of instructions, logic, or code embodied in a computer-readable storage medium and operable to facilitate the communication of payment requests to one or more systems associated with payers. Payment logic 270a may be triggered by a user request, such as when a customer purchases an item via a website interface or a mobile application. Payment logic 270a may also be triggered as part of a recurring payment. For example, a user may set up a recurring automatic payment with a utilities provider, and payee system 200a may execute payment logic 270a in order to facilitate the communication of a payment request to the customer (or an payment facilitator associated with the customer). Payment logic 270a may be stored in memory 210a or another memory associated with payee system 200a. Payment logic 270a, or portions thereof, may also be embodied in hardware associated with payee system 200a or other components of system 5. Furthermore, the components of payment logic 270a may be stored in the same or different memories of payee system 200a or associated devices. Various components of payment logic 270a may also be stored in different components of system 5.

In operation, payment logic 270a facilitates the processing of payments from a payment account utilizing one or more portions of account information 220 that are associated with the payment account. For example, when an automatic payment from a payment account is scheduled to occur, payment logic 270a may access a portion of account information 220 that is associated with the payment account. Using that information, payment logic 270a may then initiate a payment request. Payment request may be communicated to various systems. For example, payment requests may be communicated to update module 100 or any other suitable device (such as a payment processing module separate from update module 100). Payment requests may also be communicated to devices operated by a third party. For example, payment logic 270a may initiate an ACH payment by communicating a payment request to a device facilitating such payments.

In the illustrated embodiment, payee system 200b includes network interface 202b, processor 204b, and memory 210b.

Network interface 202b represents any suitable device operable to receive information from network 10, transmit information through network 10, perform suitable processing of the information, communicate to other devices, or any combination thereof. For example, network interface 202b may receive, from update module 100, one or more payment update messages. In certain embodiments, network interface 202b also facilitates payments. For example, network interface 202b may communicate with update module 100 or another device in order to request payments from the payment account to the payee associated with payee system 200*b*. Network interface 202*b* represents any port or connection, real or virtual, including any suitable hardware and/or software, including protocol conversion and data processing capabilities, to communicate through a LAN, WAN, or other communication system that allows update module 100 to exchange information with network 10, user devices 20, update module 100, other payee systems 200, other components of system 5, or any other computer directly or indirectly connected to network 10.

Processor 204*b* communicatively couples to network interface 202*b* and memory 210*b*, and controls the operation and administration of payee system 200*b* by processing information received from network interface 202*b* and memory 210*b*. Processor 204*b* includes any hardware and/or software that operates to control and process information. For example, processor 204*b* executes update logic 264*b* to control the updating of account information 222. In some embodiments, processor 204*b* also executes payment logic 270*b* to control the processing of payments. Processor 204*b* may be a programmable logic device, a microcontroller, a microprocessor, any suitable processing device, or any suitable combination of the preceding.

Memory 210*b* stores, either permanently or temporarily, data, operational software, or other information for processor 204*b*, other components of payee system 200*b*, or other components of system 5. Memory 210*b* includes any one or a combination of volatile or nonvolatile local or remote devices suitable for storing information. For example, memory 210*b* may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 210*b* may include any suitable information for use in the operation of payee system 200*b*. In the illustrated embodiment, memory 210*b* includes account information 222, update logic 264*b*, and payment logic 270*b*. Any of these components may be distributed and/or duplicated across multiple memory devices in payee system 200*b* or in other devices.

Account information 222 represents any suitable information associated with one or more payment accounts. Account information 222 may be input and/or accessed in various ways. Users may communicate account information 222 to update module 100 directly. For example, a user may input an account number, address information, and other information associated with a payment account via a website interface or a mobile application. Payee system 200*b* may also retrieve account information 222 from its own system or other systems. For example, payee system 200*b* may access account information stored by a third-party system that operates a payment service. Payee system 200*b* may also receive account information from update module 100. Account information 222 may include information associated with one or more users or payment accounts and may be stored in a relational database, tree structure, or any other suitable data structure.

Update logic 264*b* represents any suitable set of instructions, logic, or code embodied in a computer-readable storage medium and operable to facilitate the updating of account information stored by payee system 200*b*. Update logic 264*b* may be stored in memory 210*b* or another memory associated with payee system 200*b*. Update logic 264*b*, or portions thereof, may also be embodied in hardware associated with payee system 200*b* or other components of system 5. Furthermore, the components of update logic 264*b* may be stored in the same or different memories of payee system 200*b* or another device associated with payee system 200*b*. Various components of update logic 264*b* may also be stored in different components of system 5. Update logic 264*b* may be the same as or similar to update logic 264*a*. For example, in some embodiments, update logic 264*a* and 264*b*, or components thereof, may utilize common computer code to receive, interpret, and/or respond to payee update messages communicated by update module 100. In other embodiments, update logic 264*a* and 264*b* may be implemented in different manners and may perform different functions.

Payment logic 270*b* represents any suitable set of instructions, logic, or code embodied in a computer-readable storage medium and operable to facilitate the communication of payment requests to one or more systems associated with payers. Payment logic 270*b* may be triggered by a user request, such as when a customer purchases an item via a website interface or a mobile application. Payment logic 270*b* may also be triggered as part of a recurring payment. For example, a user may set up a recurring automatic payment with a utilities provider, and payee system 200*b* may execute payment logic 270*b* in order to facilitate the communication of a payment request to the customer (or a payment facilitator associated with the customer). Payment logic 270*b* may be stored in memory 210*b* or another memory associated with payee system 200*b*. Payment logic 270*b*, or portions thereof, may also be embodied in hardware associated with payee system 200*b* or other components of system 5. Furthermore, the components of payment logic 270*b* may be stored in the same or different memories of payee system 200*b* or associated devices. Various components of payment logic 270*b* may also be stored in different components of system 5. Payment logic 270*b* may be the same as or similar to payment logic 270*a*. For example, in some embodiments, payment logic 270*a* and 270*b*, or components thereof, may utilize common computer code to facilitate payments from payment accounts. In other embodiments, payment logic 270*a* and 270*b* may be implemented in different manners and may perform different additional functions.

In an exemplary embodiment of operation, user device 20 communicates account information to update module 100, which stores the account information in memory 110. Update module 100 may also receive payee system information and store this information in memory 110. Update module 100 automatically determines when an update event has occurred, which indicates that one or more portions of the account information stored by a payee system should be changed. Update module 100 then automatically communicates a payee update message that includes updated values for the updated portion of the account information.

A component of system 5 may include an interface, logic, memory, and/or other suitable element. An interface receives input, sends output, processes the input and/or output, and/or performs other suitable operations. An interface may comprise hardware and/or software. Logic performs the operation of the component. For example, logic executes instructions to generate output from input. Logic may include hardware, software, and/or other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 5 without departing from the scope of the invention. For example, system 5 may implement account updating procedures different from or in addition to those described herein. As another example, multiple update modules 100 may operate in parallel to facilitate account information updating. System 5 may include any number of user devices 20, networks 10, update modules 100, and payee systems 200. Any suitable logic may perform the functions of system 5 and the components within system 5.

Figure 2:
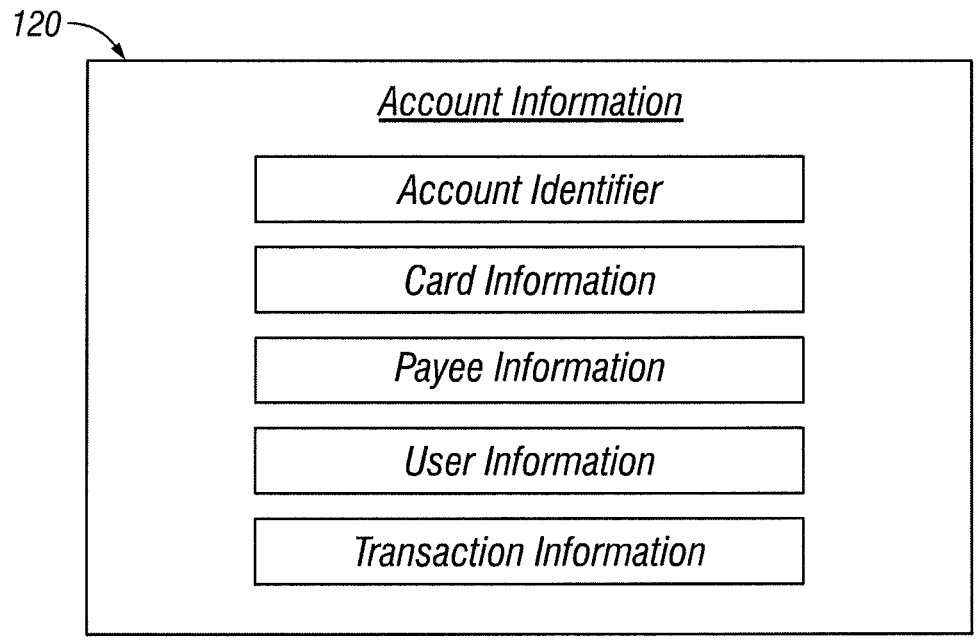
FIG. 2 illustrates example account information used by an update module.

FIG. 2 illustrates example account information 120, which includes account identifier 122, card information 124, automatic payment information 126, cardholder information 128, address information 130, and transaction information 132. Various embodiments may include some, all, or none of these components. Update module 100 may obtain this information via different types of graphical user interfaces ("GUIs"), web applications, or any other suitable means for obtaining information.

Account identifier 122 includes any suitable information indicating one or more values that identify the payment account. For example, account identifier 122 may include an account number, a card number, or another value that identifies the account. In some embodiments, account identifier 122 may uniquely identify the account. Account identifier 122 may be used during the payment process, such as during the execution of payment processing logic 170, to identify a requested payment account and/or to verify that an account identifier included in a payment request matches the information stored by update module 100 or another device processing payments.

Card information 124 includes any suitable information associated with a payment card. Card information 124 may include card numbers, expiration dates, card security codes, pin numbers, cardholder information, information indicating the spelling of a name shown on the card, or any other suitable information associated with a payment card. Card information 124 may also include information about multiple cards and/or multiple cardholders associated with a single payment account. Information associated with payment cards may be used by update module 100 or other components of system 5 to authorize payment requests, provide indications of when account information has been updated, and otherwise facilitate the updating of account information.

Payee information 126 includes any suitable information associated with one or more payees. Payee information 126 may include information identifying one or more payee systems storing account information associated with a payment account, information indicating which portions of account information 120 are being stored by particular payee systems, information associated with automatic and or recurring payments from these systems, or any other suitable information. This information may allow update module 100 to quickly and efficiently identify payee systems that store account information associated with a payment. Furthermore, payee information 126 may allow update module 100 to more effectively determine which account information updates affect which payee systems by providing information about which portions of account information 120 are stored by which systems (and, therefore, which payee systems should be updated upon a change in a particular portion of account information 120). In some embodiments, account information 120 may also include information indicating a relationship between multiple accounts (such as, for example, pooled payments from multiple accounts). For example, a payee system may be configured to process a pooled rent payment from multiple tenants. Such information may be included in payee information 126 or any other portion of memory 110, such as payment information 146.

User information 128 includes any suitable information associated with a user of a payment account. User information 128 may include such information as one or more names associated with a payment account, one or more addresses associated with a payment account, and personal information associated with one or more users of a payment account (such as, for example, birthdays, security questions and/or answers, pin numbers, usernames and/or passwords, or other user information). User information 128 may provide quicker, more effective, and/or more efficient authorization of payment requests and identification of account information updates. User information 128 may also improve the ability of update module 100 to provide a centralized mechanism for handling updates to account information 120 and effectively propagating the account information updates to one or more payee systems 200.

Transaction information 130 includes information associated with previous transactions involving particular payment accounts. For example, transaction information 130 may include information associated with previous payment requests such as the date, time, payee identifier, account number, amount, whether the payment was successful, whether the payment was an automatic and/or recurring payment, and other suitable information. Transaction information 130 may be utilized by update module 100 to provide an indication of what payee systems are configured to process automatic and/or recurring payments. For example, if transaction information 130 shows that a particular payee system submits monthly automatic payment requests, update module 100 may use this information to determine that this payee system is configured to initiate recurring auto-payments. Based on this information, update module 100 may determine that this payee system stores one or more portions of account information 120 that should be updated upon the occurrence of an update event.

Figure 3:
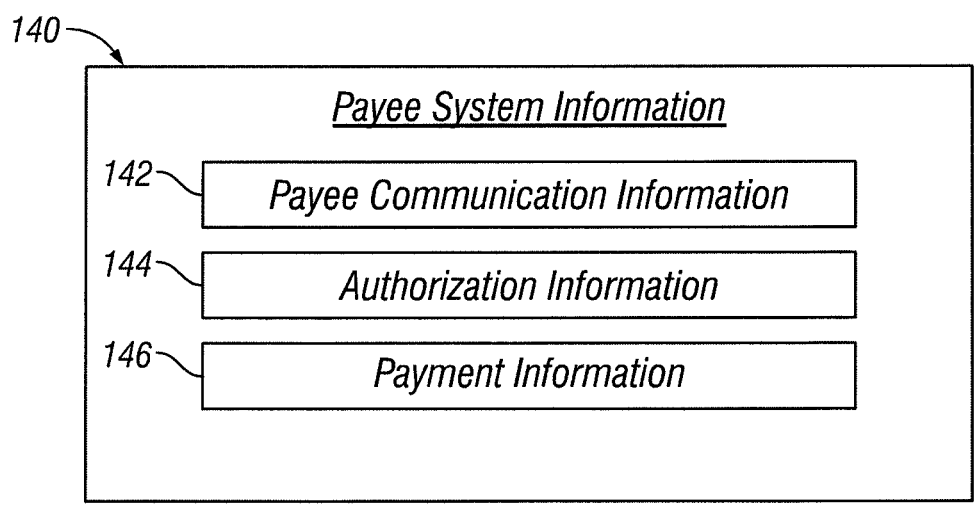
FIG. 3 illustrates example payee system information used by an update module.

FIG. 3 illustrates example payee system information 140, which includes payee contact information 142, system information 144, and payment information 146. Various embodiments may include some, all, or none of these components.

Payee communication information 142 includes any suitable information associated with payee communications. Payee communication information 142 may include phone numbers, addresses, website or other URL information, email addresses, or any other suitable information for communicating with a payee or a payee system. For example, payee communication information 142 may include information, such as a URL, allowing update module 100 to communicate with an electronic interface on payee system 200a that facilitates the updating of account information 220. In such an embodiment, update module 100 may, upon determining that an update event has occurred, use payee communication information 142 to facilitate the communication of a payee update message to payee system 200a in order to update the portions of account information 220 that correspond to the portion of account information 120 that has been updated. In another embodiment, update module 100 may include one or more portions of payee communication information in a payee update message communicated to a user of the payment account to facilitate the user updating the appropriate account information stored on the payee system. In other embodiments, update module 100 may use payee communication information 142 to communicate a payee update message to a third party (or a device used by a third party) to facilitate the updating of account information 220 and/or 222 by the third party. For example, update module 100 may communicate a payee update message including a payee phone number to a workstation used by a third party (i.e., someone who is not affiliated with the payee and is not a user of the payment account), so that the third party may call the payee to facilitate updating account information. Payee communication information 142 may also include information that facilitates the processing itself (such as, for example, computer code providing the particular steps for communicating with the user, payee, and/or third party). Payee communication information 142 may provide faster, more efficient, and more convenient updating of account information. This information may allow update module 100 to automatically update account information stored by payee systems without requiring additional action by the user. Furthermore, by facilitating communication with payee systems in order to update account information stored by those systems that no longer matches account information 120, payee communication information 142 may allow update module 100 to automatically synchronize account information stored by multiple systems on network 10.

Authorization information 144 includes any suitable information associated with the payee system that facilitates authorized updating of account information stored by these systems. Authorization information 144 may include usernames, passwords, digital certificates, pin numbers, encryption information, or any other information that facilitates authentication, authorization, access, or communication with one or more payee systems 200. For example, payee system 200a may be configured to process updates to account information 220 via a web-interface that requires a username and password, while payee system 200b may be configured to process updates to account information 222 via a web-interface that requires authorization via a digital certificate. In such an embodiment, authorization information 144 would include a username and password associated with payee system 200a and a digital certificate associated with payee system 200b. Upon determining that an update event has occurred that affects account information 220 and 222, update module 100 may use authorization information 144 to facilitate the updating of account information 220 and 222 via their respective update interfaces. Authorization information 144 may also include information that facilitates the processing itself (such as, for example, computer code providing the particular steps for obtaining authorization, authentication, or access for a particular payee system). Any such update interfaces may be configured by the user, by the payee, by a third party, or any combination thereof. System information 144 may facilitate more effective and efficient updating of account information on payee systems by enabling automatic updates that occur with little or no human intervention during the update process. Such systems may be more convenient to users, and therefore more valuable to organizations providing this service to users, because updates to account information 120 may be propagated to the relevant payee systems quickly and without additional user effort.

Payment information 146 includes any suitable information associated with payments to one or more payees. Payment information 146 may include information associated with automatic and/or recurring payments. For example, payment information 146 may include information indicating that a particular payee system is configured to process monthly payments from a payment account. Update module 100 may utilize such information to determine how to respond to update events. For example, in some embodiments, update module 100 may be configured to automatically communicate payee update messages to payee systems 200 that are configured to process automatic payment but respond differently with respect to payee systems that store portions of account information 120 but do not submit automatic or recurring payment requests. Payment information 146 may also include information indicating what portions of account information 120 are stored by respective payee systems 200. By identifying which portions of account information 120 are stored by various payee systems 200, payment information 146 may allow update module 100 to quickly and accurately identify which payee systems need to be updated upon the occurrence of an update event affecting certain portions of account information 120.

Figure 4:
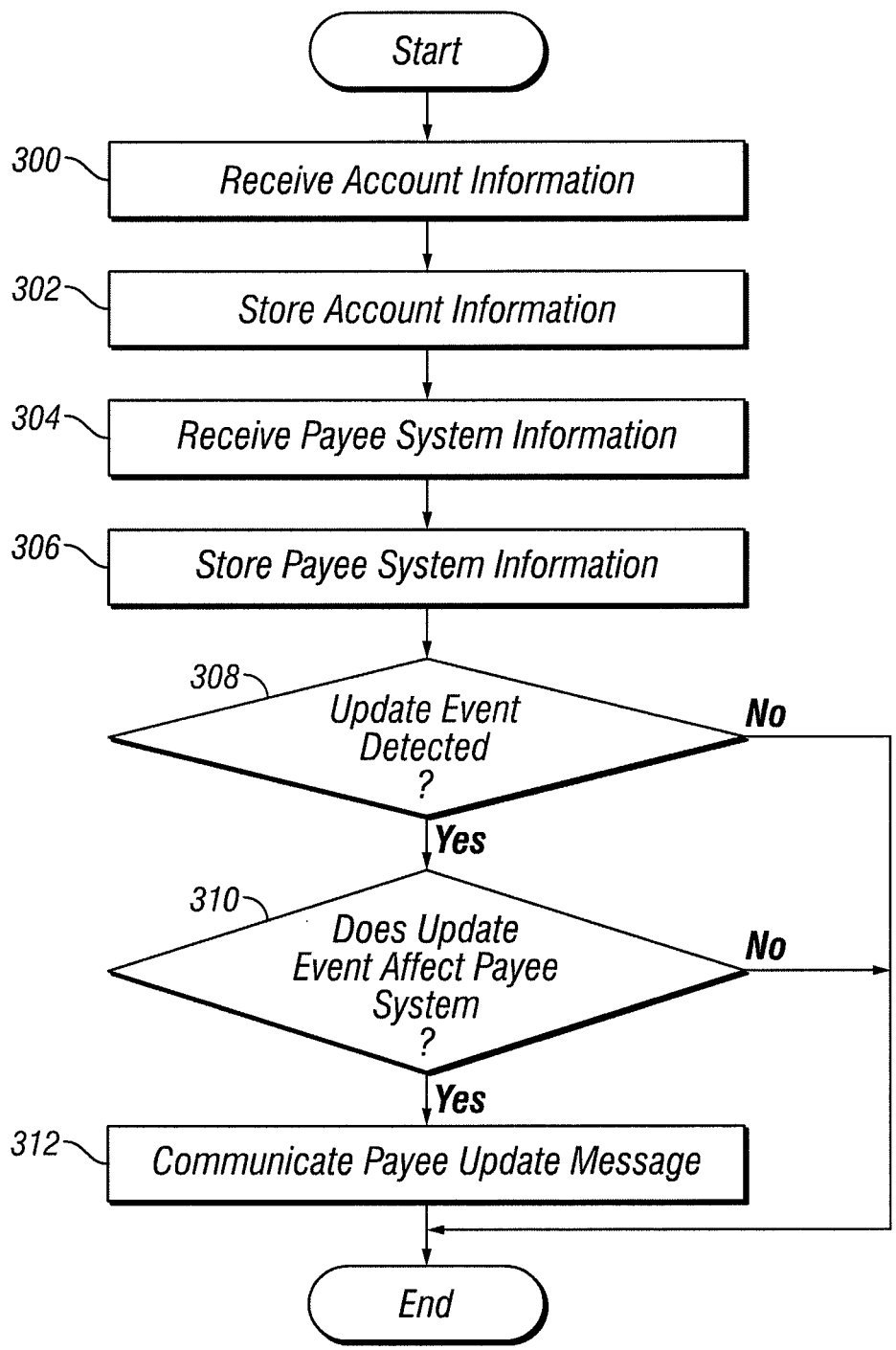
FIG. 4 illustrates an example account information update sequence.

FIG. 4 illustrates an account information updating sequence that facilitates the updating of account information stored by a payee system.

At step 300, update module 100 receives account information associated with a payment account. This account information may be received via various mechanisms and from various sources. Users may communicate account information to update module 100 directly. For example, users may input account information via a website interface or a mobile application. Users may also communicate account information to update module 100 indirectly. For example, the user may speak to a third party over the phone, and the third party may communicate account information to update module 100. Update module 100 may also retrieve account information 120 from its own system or other systems. For example, update module 100 may analyze account information stored locally or remotely to determine account information.

At step 302, update module 100 stores the account information received at step 300. Portions of this account information may also be stored by one or more payee systems during steps not illustrated in FIG. 4. Update module 100 may store portions of the account information in memory 110, another memory, or any combination thereof.

At step 304, update module 100 receives payee system information. Update module 100 may receive this information from a user, a payee, a third party, or a computer system operated by such entities. For example, users may communicate payee system information to update module 100 via a website interface or a mobile application. Update module 100 may also receive payee system information for a payee system after receiving authorization from a user. Update module 100 may also receive this information by analyzing other data. For example, update module 100 may process data stored by one or more memories to determine payee system information. Update module 100 may utilize this payee system information when constructing a payee update message during step 312.

At step 306, update module 100 stores the payee system information received at step 304. Payee system information may be stored in memory 110 and/or other memories. Different portions of payee system information may be stored in separate memories, and one or more portions may be duplicated in the same and/or other memories.

At step 308, update module 100 determines whether an update event has occurred. Update events indicate that at least a portion of account information 120 has or will change. Update events encompass direct updates to account information 120 as well as other events associated with such updating. In some embodiments, update events may be associated user input provided to update module 100. For example, one or more users may provide input indicating that an automatic rent payment that previously drew from one account should be updated so that future payments are drawn from one or more different accounts, which may be associated with different users (such as, for example, new tenants). As another example, a user may provide input to update module 100 indicating that one or more accounts (or automatic payments associated with such accounts) should be updated following a divorce. In such examples, a user may communicate information to facilitate updating payee systems so that future mortgage, utility, and/or other bill payments are drawn from a different account (such as when one spouse acquires ownership of a house following a divorce). In this manner, update module 100 may reduce the number of steps that a user must take to update payment information on various systems following the occurrence of an event that effects multiple payments.

In certain embodiments, update module 100 analyzes information stored in memory 110 or another memory (on the same device or on other devices) to determine that an update event has occurred. For example, update module 100 may determine that one or more portions of account information 120 have been updated. Update module 100 may also analyze other communications or occurrences to determine that update event has occurred or will soon occur. For example, update module 100 may determine that a payment card renewal has occurred that has or will result in a new expiration date for the card. The analysis performed by update event logic 160 may allow update module 100 to quickly, efficiently, and conveniently determine that update events have incurred, allowing subsequent update-related processing to be triggered automatically. Update module 100 may also identify the particular portions of account information 120 that have been updated as part of the update event. When no update events are detected, payments are processed according to pre-established rules.

At step 310, update module 100 determines whether the update event affects one or more payee systems. For example, upon detecting that a user has updated address information associated with a payment account, update module 100 may determine which payee systems, if any, store this address information. In some embodiments, update module 100 may determine whether such payee systems are configured to process automatic and/or recurring payments from the payment account. After identifying one or more payee systems that may now have information that does not match account information 120 (due to the update event), update module 100 proceeds to step 312. If update module 100 determines that no payee systems are affected by the update event, update module 100 may continue its normal processing.

At step 312, update module 100 communicates one or more payee update messages. Communicating a payee update message facilitates the updating of account information on a payee system in response to a previous, current, or future update of one or more portions of account information. To facilitate this updating, update module 100 automatically generates and/or communicates a payee update message including updated account information. In some embodiments, this payee update message is communicated to one or more payee systems, such as payee systems 200. For example, if update module 100 determines that an expiration date associated with a payment card has changed during step 308, it may generate and communicate a payee update message containing the new expiration date to the payee systems on which this account information is stored.

In some embodiments, update module 100 may obtain customer approval before filing. For example, update module 100 may communicate one or more payee update messages to the user (by, for example, sending an email, sending a message to a mobile application, calling the customer, or any suitable method) and await customer approval before communicating a payee update message to the affected payee systems. In some embodiments, the user may be able to edit the payment account information upon receiving this approval request.

In some embodiments, update module 100 may utilize payee system information in order to communicate the payee update message to a payee system. For example, if payee system information includes information that facilitates interaction with an account information update interface on a payee system (such as, for example, a URL, an IP address, computer code facilitating the steps involved in interacting with the update interface, or any other suitable information), update module 100 may include this information in the payee update message or may otherwise utilize this information in generating or communicating the payee update message. For example, to facilitate updating this account information via the payee update message, update module 100 may utilize payee system information to obtain authorization to make the change the payee system. For example, update module 100 may communicate a login name and password (or any other credentials) to obtain the appropriate authorization for updating the account information associated with the user on the payee system. In certain embodiments, the payee update message may be communicated to users themselves, while in still other embodiments, the payee update may be communicated to an entity other than the user or the payee, so that this entity can facilitate the updating of the account information stored by payee systems 200.

Various embodiments may perform some, all, or none of the steps described above. For example, certain embodiments may omit step 210 under certain conditions, or they may omit this step entirely. Furthermore, certain embodiments may perform these steps in different orders or in parallel, and certain embodiments may also perform additional steps. While discussed as update module 100 performing these steps, any suitable component of system 5 may perform one or more steps of the method.

Certain embodiments of the invention may provide one or more technical advantages. A technical advantage of one embodiment may provide improved maximization or rewards from payments by facilitating automatic calculations of various reward parameters, available offers, and other factors in selecting the optimal user account for a payment. Another technical advantage of an embodiment allows for improved customer experiences by automatically selecting a reward account for the customer, who may have numerous reward accounts with complicated conditions and other factors affecting the rewards received. Certain embodiments may also allow for faster checkout processing since the optimal payment choice can be selected and primed before the user begins checkout. Furthermore, some embodiments may provide an efficient mechanism for sellers to identify and market to potential customers. Certain embodiments may also allow sellers to more effectively market their products or services and offer promotions by allowing sellers to target their promotions to more receptive customers and provide promotions that are more closely tailored to the customers' interests.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interfaces 102, 202a or 202b; one or more portions of processors 104, 204a, or 204b; one or more portions of memories 110, 210a, or 210b; or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Various embodiments disclosed herein may be used together in a variety of combinations. In various embodiments, update module 100 may have different types, numbers, and configurations of interfaces 102, 202a or 202b; processors 104, 204a, or 204b; memories 110, 210a, or 210b; or any components thereof. For example, various embodiments may include some, all, or none of the components of user information 120 shown in FIG. 2 or the payee system information shown in FIG. 3. As another example, certain embodiments may include additional logic to facilitate the receiving and processing of information, the presentation of one or more GUIs, or post-transaction analysis.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A method for updating account information, the method comprising:
   receiving, by an interface, first account information associated with a payment account of a user;
   storing, by a first memory, the first account information;
   receiving, by the interface, payee system information associated with a plurality of payee systems, wherein the payee system information comprises encryption information for accessing the payee system and the plurality of payee systems store one or more portions of the first account information;
   storing, by a second memory, the payee system information associated with the plurality of payee systems;
   automatically determining, by a processor, that a first type of payment transaction from the payment account has occurred, the payment transaction generating an update event, wherein the payment transaction comprises at least an attempted transfer of funds into or out of the payment account;
   updating, based on the update event, at least a portion of the account information;
   automatically determining, by a processor, whether one or more of the plurality of payee systems is configured to initiate recurring payments from the payment account of the user; and
   if one or more of the payee systems is configured to initiate recurring payments, automatically communicating, by the interface, a payee update message comprising the updated account information to the one or more configured payee systems.

2. The method of claim 1, wherein:
   the payee system information comprises authorization information; and automatically communicating the payee update message further comprises communicating, by the interface, the authorization information to the one or more configured payee systems, wherein authorization to modify the first account information on the one or more configured payee systems is obtained based at least on the payee system information.

3. The method of claim 1, wherein automatically determining that an update event has occurred comprises automatically determining that the first account information has been updated with the updated account information.

4. The method of claim 1, further comprising:
storing, by the first memory, the updated account information; and
processing a payment request from the one or more configured payee systems after automatically communicating the payee update message, the payment request comprising the updated account information.

5. The method of claim 1, further comprising:
processing a first payment request from the one or more configured payee systems before automatically determining that the update event has occurred, the first payment request comprising the first account information; and
processing a second payment request from the one or more configured payee system after automatically communicating the payee update message, the second payment request comprising the updated account information.

6. The method of claim 1, wherein the account information comprises one or more of the following:
an account identifier associated with the payment account;
an address associated with the payment account;
an expiration date associated with a payment account;
information associated with one or more payment cards issued on the payment account;
information indicating one or more users authorized to make payments from the payment account; and
information associated with one or more fraud incidents associated with the payment account.

7. The method of claim 1, wherein the payee system information comprises one or more of the following:
payee communication information associated with the plurality of payee systems;
one or more payment dates associated with the plurality of payee systems;
a payment frequency associated with the plurality of payee systems; and
authorization information associated with the user on the plurality of payee systems.

8. The method of claim 1, wherein communicating the update message comprises communicating, by the interface, an update notification to the user.

9. An apparatus for updating account information, the apparatus comprising:
an interface operable to:
receive first account information associated with a payment account of a user;
receive payee system information associated with a plurality of payee systems, wherein the payee system information comprises encryption information for accessing the payee system and the plurality of payee systems store one or more portions of the first account information;
a first memory operable to store the first account information;
a second memory operable to store the payee system information; and
a processor communicatively coupled to the interface and the memory, the processor operable to:
automatically determine that a first type of payment transaction from the payment account has occurred, the payment transaction generating an update event, wherein the payment transaction comprises at least an attempted transfer of funds into or out of the payment account;
update, based on the update event, at least a portion of the account information;
automatically determine whether one or more of the plurality of payee systems is configured to initiate recurring payments from the payment account of the user; and
if one or more of the payee systems is configured to initiate recurring payments, automatically generate a payee update message in response to automatically determining that the update event has occurred; and
the network interface further operable to communicate the payee update message comprising updated account information to the one or more configured payee systems, the updated account information comprising one or more updated values for one or more respective portions of the first account information.

10. The apparatus of claim 9, wherein:
the payee system information comprises authorization information; and
the interface is further operable to automatically communicate the authorization information to the one or more configured payee systems, wherein authorization to modify the first account information on the one or more configured payee systems is obtained based at least on the payee system information.

11. The apparatus of claim 9, wherein automatically determining that an update event has occurred comprises automatically determining that the first account information has been updated with the updated account information.

12. The apparatus of claim 9, wherein:
the first memory is further configured to store the updated account information; and
the processor is further configured to process a payment request after automatically communicating the payee update message, the payment request comprising the updated account information.

13. The apparatus of claim 9, wherein the processor is further configured to:
process a first payment request from the one or more configured payee systems before automatically determining that the update event has occurred, the first payment request comprising the first account information; and
process a second payment request from the one or more configured payee systems after automatically communicating the payee update message, the second payment request comprising the updated account information.

14. The apparatus of claim 9, wherein the account information comprises one or more of the following:
an account identifier associated with the payment account;
an address associated with the payment account;
an expiration date associated with a payment account;
information associated with one or more payment cards issued on the payment account;
information indicating one or more users authorized to make payments from the payment account; and information associated with one or more fraud incidents associated with the payment account.

15. The apparatus of claim 9, wherein the payee system information comprises one or more of the following:
   payee communication information associated with the plurality of payee systems;
   one or more payment dates associated with the plurality of payee systems;
   a payment frequency associated with the plurality of payee systems; and
   authorization information associated with the user on the plurality of payee systems.

16. The apparatus of claim 9, wherein communicating the update message comprises communicating an update notification to the user.

17. A non-transitory computer readable storage medium comprising logic, the logic operable, when executed by a processor, to:
   receive first account information associated with a payment account of a user;
   store the first account information in a first memory;
   receive payee system information associated with a plurality of payee systems, wherein the payee system information comprises encryption information for accessing the payee system and the plurality of payee systems store one or more portions of the first account information; and
   store the payee system information associated with the plurality of payee systems in a second memory;
   automatically determine that a first type of payment transaction from the payment account has occurred, the payment transaction generating an update event, wherein the payment transaction comprises at least an attempted transfer of funds into or out of the payment account;
   update, based on the update event, at least a portion of the account information;
   automatically determine whether one or more of the plurality of payee systems is configured to initiate recurring auto-payments by periodically reviewing transactions of the plurality of payee systems; and
   if one or more of the payee systems is configured to initiate recurring auto-payments, automatically communicate a payee update message comprising the updated account information to the one or more configured payee systems.

18. The non-transitory computer readable storage medium of claim 17, wherein:
   the payee system information comprises authorization information; and
   the logic is further operable to automatically communicate the payee update message by communicating the authorization information to the one or more configured payee systems, wherein authorization to modify the first account information on the one or more configured payee systems is obtained based at least on the payee system information.

19. The non-transitory computer readable storage medium of claim 17, wherein the logic is further operable to automatically determine that an update event has occurred by automatically determining that the first account information has been updated with the updated account information.

20. The non-transitory computer readable storage medium of claim 17, wherein the logic is further operable to:
   store the updated account information in the first memory; and
   process a payment request from one or more of the plurality of payee systems after automatically communicating the payee update message, the payment request comprising the updated account information.

\* \* \* \* \*